(12) United States Patent
Weller (10) Patent No.: US 11,319,164 B2
(45) Date of Patent: May 3, 2022

(54) SELF-LOCKING CHARGING HOPPER

(71) Applicant: Kleemann GmbH, Göppingen (DE)

(72) Inventor: Christian Weller, Geislingen (DE)

(73) Assignee: Kleemann GmbH

( * ) Notice: Subject to any disclaimer, the term of this patent is extended or adjusted under 35 U.S.C. 154(b) by 41 days.

(21) Appl. No.: 16/334,504

(22) PCT Filed: Oct. 11, 2017

(86) PCT No.: PCT/EP2017/075927
§ 371 (c)(1),
(2) Date: Mar. 19, 2019

(87) PCT Pub. No.: WO2018/073068
PCT Pub. Date: Apr. 26, 2018

(65) Prior Publication Data
US 2021/0323774 A1   Oct. 21, 2021

(30) Foreign Application Priority Data

Oct. 18, 2016 (DE) .................... 10 2016 119 797.1

(51) Int. Cl.
*B65G 47/20* (2006.01)
*B65G 21/10* (2006.01)
(Continued)

(52) U.S. Cl.
CPC ............ *B65G 47/20* (2013.01); *B02C 21/026* (2013.01); *B02C 23/02* (2013.01); *B07B 1/005* (2013.01);
(Continued)

(58) Field of Classification Search
CPC ................................ B65G 21/10; B65G 47/20
(Continued)

(56) References Cited

U.S. PATENT DOCUMENTS

| 6,695,390 B2 * | 2/2004 | Bucco Morello ...... B60J 5/0498 160/210 |
| 7,347,311 B2 * | 3/2008 | Rudge .................... B65G 21/14 198/313 |

(Continued)

FOREIGN PATENT DOCUMENTS

| CN | 2633654 Y | 8/2004 |
| CN | 2804614 Y | 8/2006 |

(Continued)

OTHER PUBLICATIONS

US 2021/0001349 A1, Kopf et al., Jan. 7, 2021.*
(Continued)

*Primary Examiner* — Douglas A Hess
(74) *Attorney, Agent, or Firm* — Lucian Wayne Beavers; Patterson Intellectual Property Law, PC (57) ABSTRACT

The invention relates to a charging unit of a material processing apparatus having a charging hopper, the side walls (22) and rear walls (23) of which can be folded over between a working and a transport position by means of actuators (40, 50). A deflection element is provided, which converts the movement of an actuator during a portion of a movement thereof into a rotational movement of the rear wall or of the side wall and, during a further portion, into a translational movement. As a result of the rotational movement, the rear and side wall can be pivoted between the working and transport position, while by means of the translational movement, the rear and side wall can be connected to each other by means of an appropriate closure (60). By means of the deflection element, a simple, self-securing, and economical structure of the charging hopper is made possible.

16 Claims, 4 Drawing Sheets

(51) Int. Cl.
*B02C 21/02* (2006.01)
*B02C 23/02* (2006.01)
*B07B 1/00* (2006.01)
*B07B 13/16* (2006.01)

(52) U.S. Cl.
CPC .......... *B07B 13/16* (2013.01); *B65G 2201/04* (2013.01); *B65G 2812/0627* (2013.01)

(58) Field of Classification Search
USPC .................. 198/581, 632; 241/101.74, 285.1
See application file for complete search history.

(56) References Cited

U.S. PATENT DOCUMENTS

| | | | | |
|---|---|---|---|---|
| 8,763,780 | B2* | 7/2014 | Schreiner | B65G 33/24 |
| | | | | 198/313 |
| 8,925,712 | B2* | 1/2015 | Dunn | B60P 1/26 |
| | | | | 198/632 |
| 8,936,819 | B2 | 1/2015 | Perentes et al. | |
| 9,242,803 | B2* | 1/2016 | Murphy | B02C 21/02 |
| 9,833,787 | B2* | 12/2017 | McDevitt | B02C 23/02 |
| 10,464,070 | B2* | 11/2019 | Pajunen | B65G 11/206 |
| 2013/0306437 | A1 | 11/2013 | Dunn | |
| 2014/0124337 | A1 | 5/2014 | Murphy | |
| 2017/0197218 | A1 | 7/2017 | McDevitt | |

FOREIGN PATENT DOCUMENTS

| | | |
|---|---|---|
| CN | 101973443 A | 2/2011 |
| CN | 201872987 U | 6/2011 |
| CN | 202273232 U | 6/2012 |
| CN | 203410866 U | 1/2014 |
| CN | 103826507 A | 5/2014 |
| CN | 204104482 U | 1/2015 |
| EP | 2664492 A2 | 11/2013 |
| EP | 2730459 A2 | 5/2014 |
| EP | 2949397 A1 | 12/2015 |
| GB | 2496522 A | 5/2013 |
| JP | 10034008 A | 2/1998 |
| JP | 11278147 A | 10/1999 |

OTHER PUBLICATIONS

PCT International Search Report of corresponding PCT/EP2017/075927, dated Feb. 1, 2018, 13 pages (not prior art).
China Search Report for corresponding patent application No. 2017800637327, dated Jun. 11, 2020, 3 pages (not prior art).

* cited by examiner

SELF-LOCKING CHARGING HOPPER

The invention relates to a charging unit of a material processing apparatus having a charging hopper with at least one pivotably mounted side wall and with a pivotably mounted rear wall, wherein the side wall and the rear wall are pivotable between a folded-down transport position and a folded-out working position by means of actuators, wherein in the transport position at least one side wall is connected to the rear wall by means of at least one releasable closure and wherein the closure is lockable or unlockable by means of a movement of the side wall or the rear wall.

Such a charging hopper is disclosed in EP 2949397 A1. The charging hopper is formed from two opposingly arranged side walls and a rear wall connecting the side walls on the rear side. Both the side walls and the rear wall are rotatably connected to a chassis of a material processing apparatus. The walls may be pivoted, therefore, between a folded-down transport position and a folded-out working position. When folded-out, the side walls and the rear wall form a charging hopper via which material to be treated may be supplied to the material processing apparatus. In this position, the side walls are connected to the rear wall via closure elements. The adjustment of the side walls and the rear wall between the transport position and the working position takes place by means of actuators acting between the chassis and the walls. For the rear wall, or alternatively for the side walls, a linear movement is provided in addition to the rotational movement. This permits the rear wall or the side walls to be displaced in a linear manner in the folded-out position thereof. The closure elements are designed such that they engage in one another or are released from one another by means of the linear displacement of the rear wall or the side walls. For closing the charging hopper, for example, initially the rear wall is folded out and lifted by means of the linear adjustment. Subsequently, the side walls are folded out. In this position, the closure elements attached to the rear wall and the closure elements attached to the side walls are superimposed. By lowering the rear wall the closure elements engage in one another. The side walls and the rear wall are thereby fixedly connected to one another so that even if an actuator malfunctions they do not fall back into their transport position. In order to adjust the charging hopper back into its transport position, initially the rear wall is lifted and the side walls folded down. Subsequently, the rear wall is adjusted in a linear manner downwardly and then folded into its transport position.

A drawback for carrying out the rotational movement and the linear movement of the rear wall, or alternatively of a side wall, is that two actuators are required, for example in the form of hydraulic cylinders. These actuators have to be designed such that in each case they are able to bear the weight of the rear wall and/or the side wall. Accordingly, actuators which are powerful and thus expensive have to be provided. Moreover, the movement sequence of the actuators has to be adapted accurately to one another which requires a corresponding controller.

Therefore, it is the object of the invention to provide a charging unit which has a self-locking charging hopper with a reduced requirement for components and thus costs.

The object of the invention is achieved by in each case a first actuator being provided for adjusting the rear wall and a second actuator being provided for adjusting the side wall and that at least one deflection member is provided which converts the movement of the first actuator during a portion of the movement thereof into a rotational movement of the rear wall and, during a further portion, into a translational movement of the rear wall or that the deflection member converts the movement of the second actuator during a portion of the movement thereof into a rotational movement of the side wall and, during a further portion, into a translational movement of the side wall. By means of the deflection member it is possible by using a single actuator to bring about both the rotational movement for erecting or folding down the side wall or the rear wall and also the linear movement thereof for unlocking and for locking the side wall to the rear wall. Thus one actuator may be dispensed with, relative to the known self-locking charging hoppers. The rotational movement and the translational movement are carried out within predetermined control regions of the actuator and are mechanically predetermined by the deflection member. Thus advantageously the movement sequences of the two actuators do not have to be adapted to one another by the appropriate activation thereof. As a result, the reliability and the inherent safety of the system is increased.

A simple, cost-effective and mechanically high load-bearing construction of the deflection member may be achieved by the deflection member having a linear guide in which the rear wall or the side wall is mounted in a linearly movable and rotatable manner. If an actuator acts on the rear wall and/or side walls mounted in the deflection member, initially a translational movement is carried out until the end of the linear guide is reached. With further action of the actuator, the rotational movements of the rear wall and/or side wall follow from then on.

The rotational and the translational movement may be permitted by the actuator being rotatably connected to the rear wall or the side wall, such that a linear adjusting direction of the actuator is oriented laterally spaced apart from a rotational axis of the rear wall or the side wall and that a force component of the force transmitted by the actuator to the rear wall or the side wall is oriented in the direction of the linear guide. As the force acts laterally to the rotational axis, a lever is formed which leads to a rotational movement of the rear wall and/or the side wall. The force component acting in the direction of the linear guide, however, leads to the linear adjustment of the rear wall and/or side wall.

The locking of the rear wall to the side wall is carried out by the translational movement of at least one of the two walls. If it is provided that the linear guide is oriented in its longitudinal extent in the direction of a component of the acting force of gravity, when the actuator is not acting the side wall and/or rear wall is forced by gravity along the linear guide into its lower position. This corresponds to the locked position. The side wall and the rear wall thus remain connected together even in the case of a malfunction of an actuator. The walls are not able to fall out of their working position into the transport position. As a result, the risk of an accident is significantly reduced.

Corresponding to a preferred variant of the invention, it may be provided that the closure is formed from a closure receiver and a closure insert and that by the translational movement of the rear wall or the side wall the closure insert is able to be introduced in the direction of a component of gravity into the closure receiver for locking the rear wall to the side wall, and for the unlocking procedure said closure insert is able to be lifted counter to the component of gravity out of the closure receiver. As a result, the connection between the side wall and the rear wall remains closed by gravity irrespective of a malfunction of an actuator. To this end, it is advantageous if the linear guide is also oriented in the direction of a component of gravity.

It may be advantageously provided that the closure receiver and the closure insert are configured to be self-centering relative to one another, in particular that the closure receiver is designed as a semi-spherical socket and the closure insert is designed as a ball or spherical portion or that the closure insert is configured as a cone and the closure receiver is configured as a conical receiver. Thus a self-locating closure is formed which results in the side wall and the rear wall being oriented in an accurate position relative to one another, even in the case of greater tolerances being present during the locking procedure. The combination of a ball and/or a spherical portion with the semi-spherical socket represents a closure which is mechanically very robust. With a closure formed from a cone and a conical receiver, very large closing forces may be produced.

A secure engagement of the closure insert in the closure receiver may be achieved by the closure receiver being assigned a guide element protruding over the closure receiver and by the guide element having a guide surface which extends in an inclined manner for the linear movement of the closure insert and toward the closure receiver. During the locking procedure, the guide element directs the closure insert toward the closure receiver. Such an embodiment ensures that the closure insert always moves reliably into the closure receiver, in particular even if, for example, a widened hopper portion is positioned on the rear wall which leads to a displacement of the overall center of gravity or if the machine is located obliquely on a slope.

The force transmitted by the actuator to the side and/or rear wall is overlaid by gravity. Moreover, the center of gravity may be located at a distance from the line of action predetermined by the actuator. If during the displacement movement from the working position into the transport position the center of gravity on its movement path now intersects the line of action, this may lead to an unstable position of the rear wall or the side wall over a small portion of its adjusting movement. In order to cushion an abrupt shifting of the rear/side wall, it may be provided that a spring element acts on the rear wall or side wall mounted in the deflection member, such that a torque acting in the direction of the working position is transmitted to the rear wall or the side wall. The torque introduced by the spring element is preferably greater with the side and/or rear wall erected than the torque produced by the weight force so that overall a torque which acts in the direction of the working position is maintained.

A structurally simple and economical solution for introducing the torque by the spring element may be provided by the rear wall or the side wall being mounted by means of a guide bolt in the linear guide and by the spring element being coupled to the guide bolt such that a force oriented in the direction of the longitudinal extent of the linear guide is transmitted to the guide bolt, said force producing a torque acting on the rear wall or the side wall about the mounting point of the actuator. The spring element in this case preferably acts in the direction of a component of gravity. As a result, the spring element introduces a force on one side of the mounting point of the actuator, whilst the center of gravity of the side wall or rear wall is arranged on the opposing side of the mounting point. The torques produced are accordingly oriented in opposing directions. By a suitable dimensioning of the spring force, the rear and/or side wall is subjected to a resulting torque acting in the direction of its working position.

A high mechanical load-bearing capacity of the charging hopper may be achieved by the pivotably mounted side wall being supported in its folded-out working position by means of at least one supporting strut and by the rear wall which is movable in a pivotable and linear manner being retained by the closure on the side wall or by the pivotably mounted rear wall in its folded-out working position being supported by means of at least one supporting strut and by the side wall which is movable in a pivotable and linear manner being retained by the closure on the rear wall. The supporting strut preferably supports the rear and/or side wall against a chassis of the material processing apparatus. Thus large forces, as occur when loading the charging unit, may be deflected to the chassis. The translationally and rotationally mounted rear and/or side wall is connected by the closure to the side and/or rear wall supported by the supporting strut and, as a result, secured in its position in a mechanically load-bearing manner. Preferably, the closure is designed such that it is able to transmit large forces.

In order to protect the actuator from damage it may be provided that the supporting strut has a U-shaped profile and that in the working position of the charging hopper at least one of the actuators is at least partially enclosed by the supporting strut.

A load-bearing connection between the rear wall and the side wall may be achieved by the closure being arranged between the upper ends of the rear wall and the side wall facing one another in the working position.

The invention is described in more detail hereinafter with reference to an exemplary embodiment shown in the drawings, in which.

Figure 1:
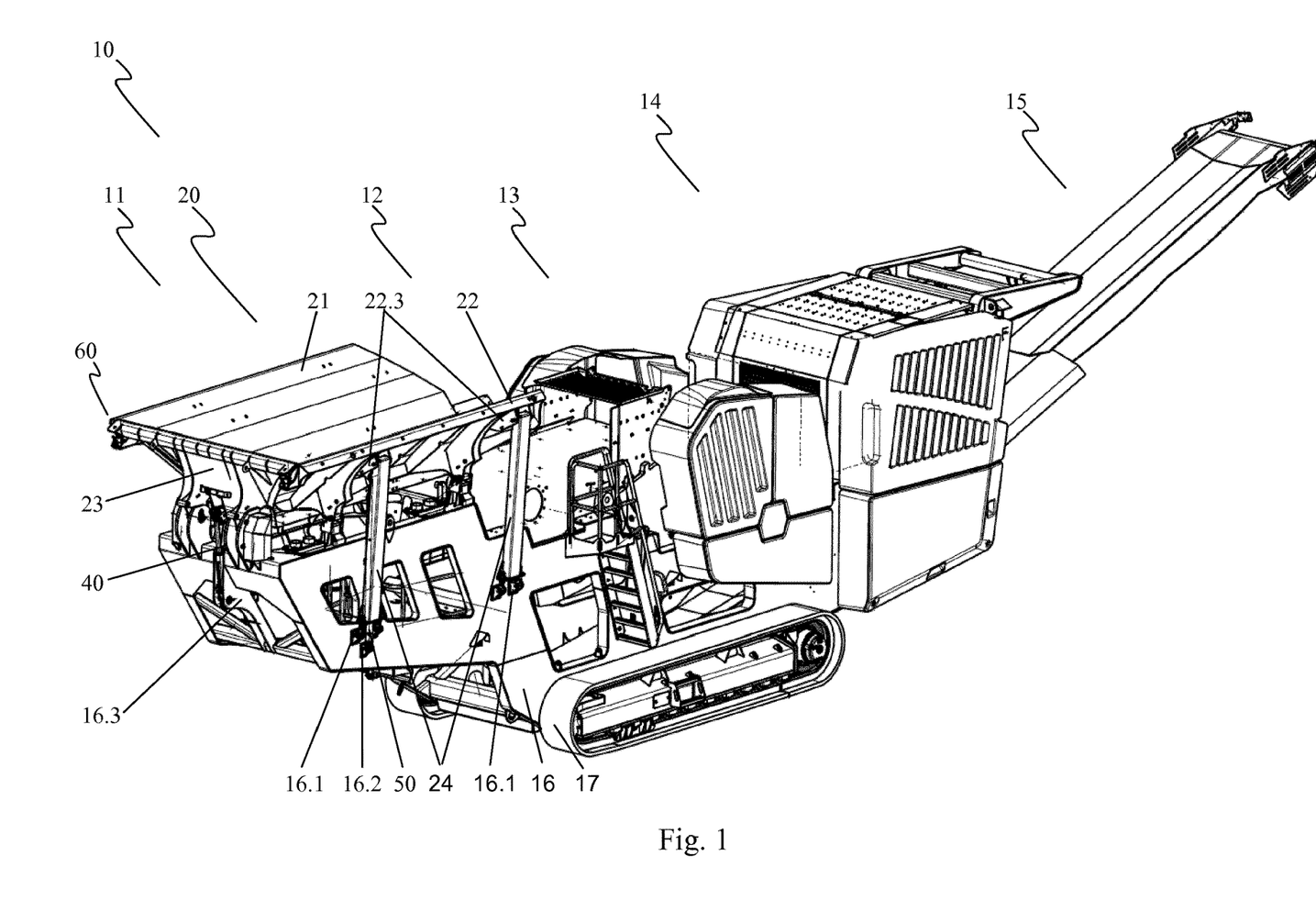
FIG. 1 shows in a perspective side view a mobile material processing apparatus having a charging unit with a charging hopper in its working position.

FIG. 1 shows in a perspective view a mobile material processing apparatus 10 having a charging unit 11 with a charging hopper 20 in its working position. The invention may also be used for stationary material processing apparatuses 10.

Downstream of the charging unit 11 are arranged a downstream prescreening unit 12, a crusher 13, a drive unit 14 and a conveyor belt 15 which are fastened to a chassis 16 of the material processing apparatus 10. The material processing apparatus 10 may move autonomously by means of a track drive 17.

Two opposingly arranged side walls 21, 22 and a rear wall 23 are assigned to the charging hopper 20. The side walls 20, 21 and the rear wall 23 are designed to be curved toward the interior of the charging hopper 20. In this case, the side walls 21, 22 close the charging hopper 20 to the side. The rear wall 23 closes the charging hopper 20 on the side remote from the prescreening unit 12. The side walls 21, 22 are connected in each case by means of a closure 60 to the rear wall 23. Toward the prescreening unit 12 the charging hopper 20 is open.

FIG. 1 shows the charging unit 11 in its working position. In this case the pivotably mounted side walls 21, 22 and the pivotably mounted rear wall 23 are folded up by means of actuators 40, 50. Hydraulic cylinders are provided as actuators 40, 50. These hydraulic cylinders are movably fastened to the chassis 16 and to the rear wall 23 and/or the side walls 21, 22. To this end, a lateral actuator counter bearing 16.2 and a rear-side actuator counter bearing 16.3 are arranged on the chassis 16. In the working position, the side walls 21, 22 are supported by supporting struts 24 against the chassis 16. The supporting struts 24 are releasably mounted on lower supporting receivers 16.1 which are fastened to the chassis 16. On the opposing side, the supporting struts 24 are pivotably fastened to upper supporting receivers 22.3, which in each case are arranged on the side walls 21, 22. In the present case, the supporting struts 24 are designed as U-shaped profiles. In the working position, the lateral second actuator 50 is covered by the U-shaped profile of the assigned supporting struts 24. As a result, the second actuator 50 is arranged so as to be protected from damage.

In the working position, the material processing apparatus 10 may be supplied with material to be crushed, for example rocks, via the charging hopper 20 of the charging unit 11. The material is passed to the prescreening unit 12 and from there to the crusher 13. In the crusher 13 the material is crushed to the desired size and transported away via the conveyor belt 15. The individual pieces of aggregate are driven via the drive unit 14.

The side walls 21, 22 are supported on the chassis 16 by the supporting struts 24. As a result, even large forces, for example when loading the charging unit 11 with large rocks, may be diverted to the chassis 16 without the second actuator 50 being subjected to load. The rear wall 23 is connected by the closures 60 to the side walls 21, 22 so that even forces acting on the rear wall 23 may be safely absorbed and forwarded to the chassis 16.

Figure 2:
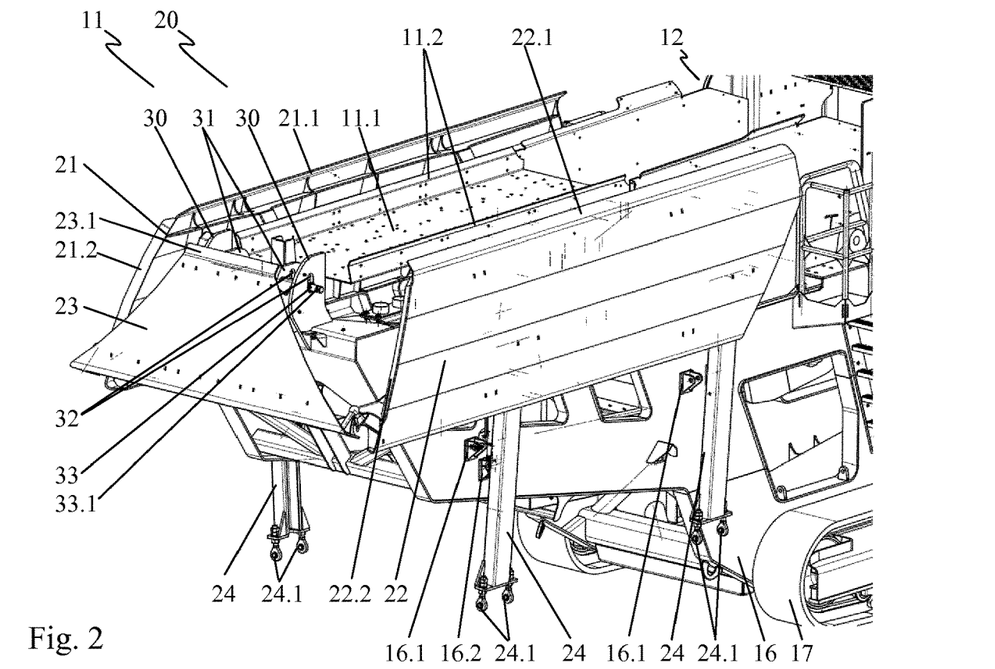
FIG. 2 shows the charging hopper shown in FIG. 1 in its transport position.

FIG. 2 shows the charging hopper 20 shown in FIG. 1 in its transport position. The side walls 21, 22 and the rear wall 23 are folded down by means of the actuators 40, 50. To this end, the supporting struts 24 have been released from the lower supporting receivers 16.1. For connecting the supporting struts 24 to the lower supporting receivers 16.1, fastening eyes 24.1 are attached on the end side to the supporting struts 24, a corresponding fastening bolt being able to be pushed therethrough.

By the folded-down side walls 21, 22 and the folded-down rear wall 23, the view of a vibrating charging channel 11.1 of the charging unit 11 is uncovered. In the working position, the material supplied to the charging unit 11 is transported to the prescreening unit 12 by the vibrating charging channel 11.1. The vibrating charging channel 11.1 is defined laterally by side rails 11.2. The side rails 11.2 are designed such that when the side walls 21, 22 are folded out they are encompassed by inlet plates 21.1, 22.1. Along the longitudinal sides of the side walls 21, 22 facing the vibrating charging channel 11.1 the inlet plates 21.1, 22.1 are connected thereto. By this arrangement of the inlet plates 21.1, 22.1 and the side rails 11.2 it is ensured that material supplied to the charging hopper 20, which has been adjusted into the working position, is conducted onto the vibrating charging channel 11.1 and does not fall off to the side. Angled portions 21.2, 22.2 which are oriented so as to be angled back relative to the side walls 21, 22 are attached to the ends of the side walls 21, 22 facing the rear wall 23. These angled portions are guided in the working position of the charging hopper 20 from the inside along the outer edges of the rear wall 23. These angled portions in each case bridge a possible gap formed between the rear wall 23 and the side walls 21, 22. As a result, material supplied to the charging unit 11 is not able to fall out of the charging hopper 20 at this point.

In the exemplary embodiment shown, the side walls 21, 22 are pivotably connected to the chassis 16. The mounting of the rear wall 23 permits a rotational movement and a linear movement. To this end, a correspondingly designed deflection member is provided. The deflection member in the present case has two outer retaining webs 30 and two inner retaining webs 31 arranged spaced apart therebetween. The retaining webs 30, 31 are configured in a plate-shaped manner. These retaining webs are connected to the chassis 16 and oriented in the direction of the longitudinal extent of the vibrating charging channel 11.1. Linear guides 32 in the form of slots are introduced into the retaining webs 30, 31. The linear guides 32 are oriented vertically and thus in the direction of the acting gravity. The linear guides 32 can be described as defining a guide direction. Guide bolts 33 are mounted in the linear guides 32. In this case, one respective guide bolt 33 is guided by an outer retaining web 30 to an adjacent inner retaining web 31. In each case, a guide bolt 33 is thus mounted in a rotatably and linearly adjustable manner in the linear guides 32 of two opposing outer and inner retaining webs 30, 31. The rear wall 23 in each case is connected between the outer and the inner retaining web 30, 31 to the guide bolt 33. As a result, both a rotational and a translational movement of the rear wall 20 is possible. In the transport position, the rear wall is folded down and the guide bolts 33 are located at the lower end of the linear guide 32. To the side adjacent to the outer retaining webs 30 the guide bolts 33 in each case have a circumferential groove 33.1. In each case a tension spring, not shown, is mounted in this groove. On the opposite side, the tension springs are connected to the chassis 16 such that they transmit a force acting in the direction of the longitudinal extent of the linear guides 32 and in the direction of at least one component of gravity onto the guide bolts 33. The tension spring thus pulls the guide bolts 33 into their lower position, shown, of the linear guide 32.

On its internal end the rear wall 23 has a transversely extending terminal portion 23.1 In the working position this terminal portion is brought directly up to the vibrating charging groove 11.1 so that no material introduced into the charging hopper 20 is able to fall from the vibrating charging groove 11.1 at this point.

By the side walls 21, 22 and the rear wall 23 being folded down into their transport position, both the overall height and the overall width of the material processing apparatus 10 may be significantly reduced relative to its working position. This permits transport of the material processing apparatus 10 on public highways.

Figure 3:
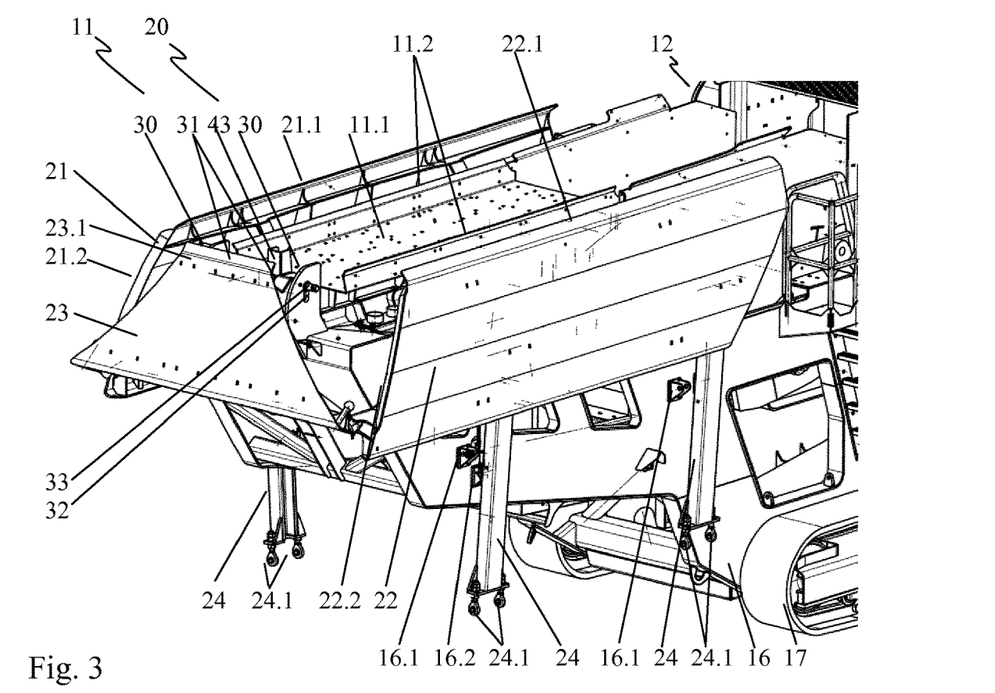
FIG. 3 shows the charging hopper shown in FIG. 2 with a rear wall lifted in a linear manner.

In FIG. 3 the charging hopper 20 shown in FIG. 2 is shown with a rear wall 23 lifted in a linear manner relative to the transport position shown in FIG. 2. This corresponds to the first movement step when adjusting the charging hopper 20 from its transport position into the working position. In order to reach this lifted position, the first actuator 40 is correspondingly extended. As is shown in FIG. 1 and more clearly in FIGS. 4, 5 and 6 the first actuator 40 on one side is rotatably secured to the chassis 16 about a first rotational axis. On the opposite side, the first actuator 40 is rotatably mounted on the outer face of the rear wall 23 about a second rotational axis. The two rotational axes are in this case oriented in the same direction. The point of action of the actuator 40 is located between the pivot axis formed by the guide bolts 33 and the center of gravity of the rear wall 23. Thus the movement of the actuator 40 in its first portion, which is defined by the length of the linear guide 32, leads to a translational movement of the rear wall 23.

Figure 4:
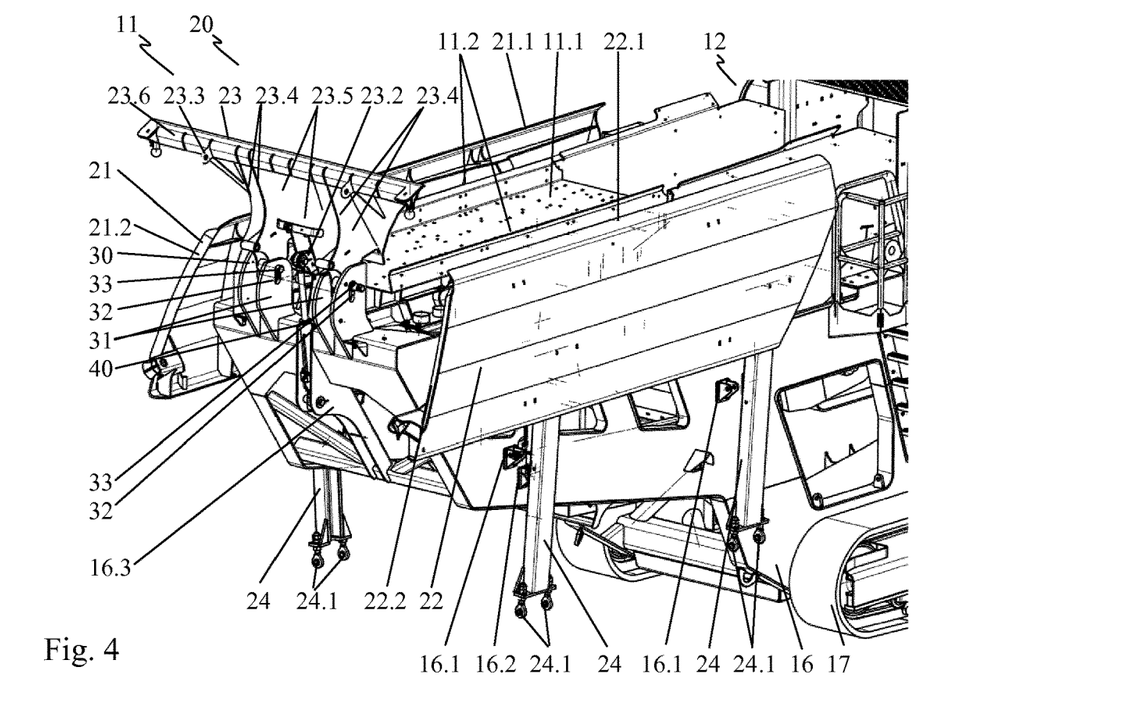
FIG. 4 shows the charging hopper shown in FIG. 3 with a rear wall folded out and lifted in a linear manner.

FIG. 4 shows the charging hopper 20 shown in FIG. 3 with a rear wall 23 folded out and lifted in a linear manner. The side walls 21, 22 are still located in their transport position.

The outer and inner strut pairs 23.4, 23.5 are attached to the now visible outer face of the rear wall 23, preferably welded thereto, for reinforcement. The edge 23.6 of the rear wall 23 remote from the guide bolts 33 is also bent back outwardly for reinforcement. Slots are introduced into the bent-back edge 23.6, the ends of the strut pairs 23.4, 23.5 being inserted therein. Moreover, lifting eyes 23.3 are attached in adjacent slots and connected, preferably welded, there to the bent-back edge 23.6.

The first actuator 40 of the rear wall 23 which is designed as a hydraulic cylinder is effective between the rear-side actuator counter bearing 16.3 and a rear-side actuator bearing 23.2. The rear-side actuator bearing 23.2 is arranged between the inner strut pairs 23.5. As already set forth relative to FIG. 3, the rotational axes of the rear-side actuator counter bearing 16.3 and the rear-side actuator bearing 23.2 are oriented in the same direction.

The position of the rear wall 23 when folded out and lifted in a linear manner, starting from the lifted position shown in FIG. 3, is reached by further extension of the actuator 40. In the lifted position shown in FIG. 3, the guide bolts 33 bear against the upper end of the linear guide 32 formed by the slots. The further extension of the actuator 40 thus leads to a rotational movement of the rear wall 23 about the rotational axis formed by the guide bolts 33. The rotational movement is preferably carried out as far as a stop. Relative to the rotational movement, this corresponds to the end position of the rear wall 23.

Figure 5:
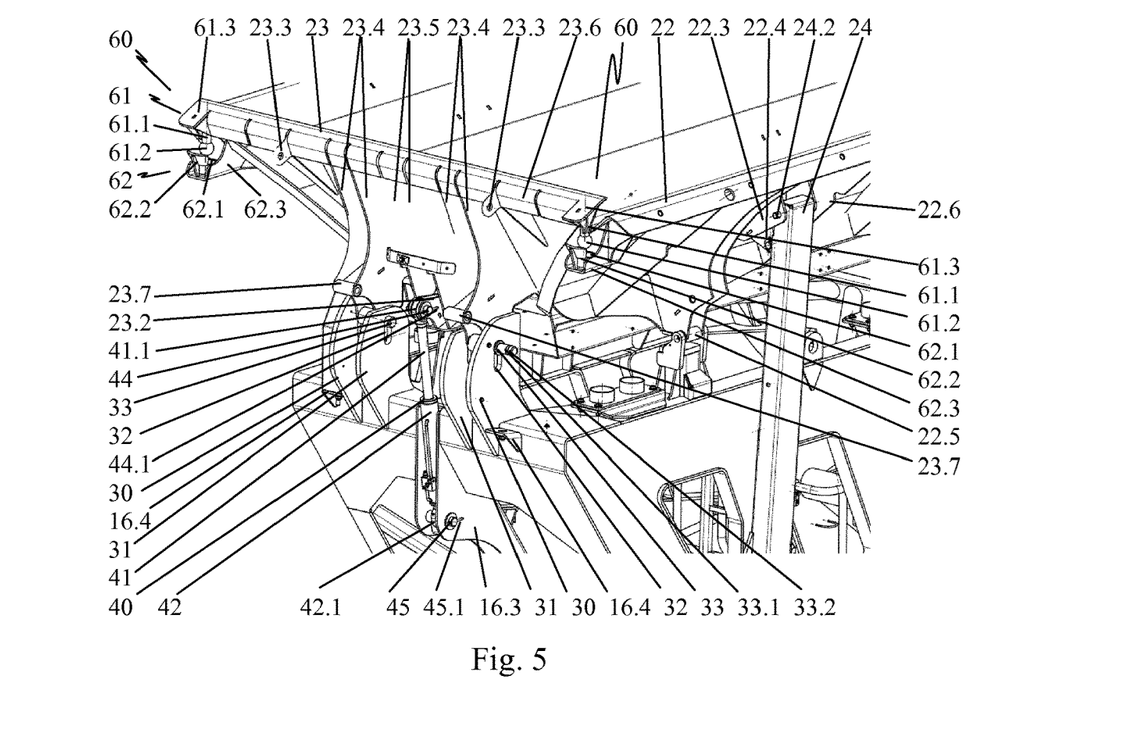
FIG. 5 shows a detail of the charging hopper shown in FIG. 4 with folded-out side walls and FIG. 6 shows the detail shown in FIG. 5 of the charging hopper with a lowered rear wall.

FIG. 5 shows a detail of the charging hopper 20 shown in FIG. 4 with the side walls 21, 22 folded out. In this case, the rear wall 23 is located in its position where it is folded out and lifted in a linear manner, shown in FIG. 4. The guide bolts 33 bear against the upper end of the linear guide 32. In each case a tension spring, not shown, is tensioned between the guide bolts 33 and respectively a spring counter bearing 16.4. The spring counter bearings 16.4 are fastened to the chassis 16, preferably welded thereto. The tension springs are retained in the grooves which are integrally formed in the guide bolts 33. To the side of the grooves, the guide bolts 33 are penetrated by bores 33.2 for receiving securing cotter pins. These securing cotter pins axially secure the guide bolts 33.

In the lifted position of the rear wall 23, a piston rod 41 is extended from a cylinder 42 of the actuator 40 as far as the stop for the rotational and translational movement of the rear wall 23. A first mounting eye 41.1 is attached to the end of the piston rod 41. A first bolt 44 is guided through the first mounting eye 41.1 and through bores congruent therewith in the rear-side actuator bearing 23.2. The first bolt 44 forms an articulated connection between the first actuator 40 and the rear wall 23. Axially the first bolt 44 is secured by a first cotter pin 44.1. A second mounting eye 42.1 is fastened to the cylinder 42 of the first actuator 40. A second bolt 45 rotatably connects the second mounting eye 42.1 to the rear-side actuator counter bearing 16.3. The second bolt 45 is axially secured by a second cotter pin 45.1.

A stop 43 on the chassis is used for limiting the erecting movement of the rear wall 23, as shown in FIG. 2. A counter stop of the rear wall 23 bears against this stop 43.

A bushing 23.7 is arranged in each case between the outer strut pairs 23.4.

The side walls 21, 22 are pivoted by the second actuators 50 into their working position. To this end, the side walls 21, 22 are mounted on rotary bearings 22.5. The second actuators 50 are rotatably mounted on lateral actuator bearings 22.4 about rotational axes oriented in the direction of the longitudinal extent of the side walls 21, 22. The linear movement of the second actuators 50 is thus converted into rotational movements of the side walls 21, 22. Each side wall 21, 22 is assigned a second actuator 50, preferably in the form of a hydraulic cylinder. The supporting struts 24 are also pivotably connected to the upper supporting receivers 22.3 by means of upper transverse bolts 24.2. In the working position shown of the side walls 21, 22, the second actuators 50 are in each case shielded outwardly by the supporting struts 24 assigned to the U-shaped profile. As shown in FIG. 1, the supporting struts 24 opposite the upper supporting receivers 22.3 are connected to the chassis 16 via the lower supporting receivers 16.1. The rear faces of the side walls 21, 22 are reinforced by reinforcing struts 22.6. By means of this construction, large forces, as may be transmitted by the material introduced into the charging hopper, may be safely absorbed and forwarded to the chassis.

In the exemplary embodiment shown, the closures 60 are formed in each case from a closure insert 61 and a closure receiver 62. In this case, the closure inserts 61 are assigned to the rear wall 23 and the closure receivers 62 are assigned to the side walls 21, 22. The closure inserts 61 are arranged to the side of the bent-back edge 23.6. To this end, the edge 23.6 is not fully bent down on the opposing sides of the rear wall 23. In each case a foot 61.1 which bears a ball 61.2 is fastened to the retaining portions 61.3 thus formed. The retaining portion 61.3, the foot 61.1 and the ball 61.2 are preferably welded together. In the position of the rear wall 23 folded out and lifted in a linear manner and the folded-out position of the side walls 21, 22 the closure inserts 61 are oriented with the ball 61.2 in the direction of the closure receivers 62. The closure receivers 62 are in each case assigned a receiver socket 62.1, a guide element 62.2 and a retaining profile 62.3. The retaining profiles 62.3 are connected to the respective side wall 21, 22, preferably welded thereto. The retaining profiles bear the receiver sockets 62.1. These receiver sockets are oriented so as to be open in the direction of the balls 61.2 of the closure inserts 61. The inner contours thereof are adapted to the outer contours of the balls 61.2. The guide elements 62.2 are arranged on the ends of the retaining profiles 62.3 remote from the side walls 21, 22. The guide elements are preferably connected to a retaining profile 62.3 or the edge of a receiver socket 62.1, in particular welded thereto. These guide elements form in each case an obliquely extending guide surface which is oriented toward the receiver socket 62.1.

In the lifted position of the rear wall 23, the closure inserts 61 are directly arranged above the closure receivers 62. The rear wall 23 is in this case lifted sufficiently far that the closure inserts 61, in the present case the balls 61.2, with a pivoting movement of the rear wall 23 are guided into their transport position via the upper edge of the guide elements 62.2.

Figure 6:
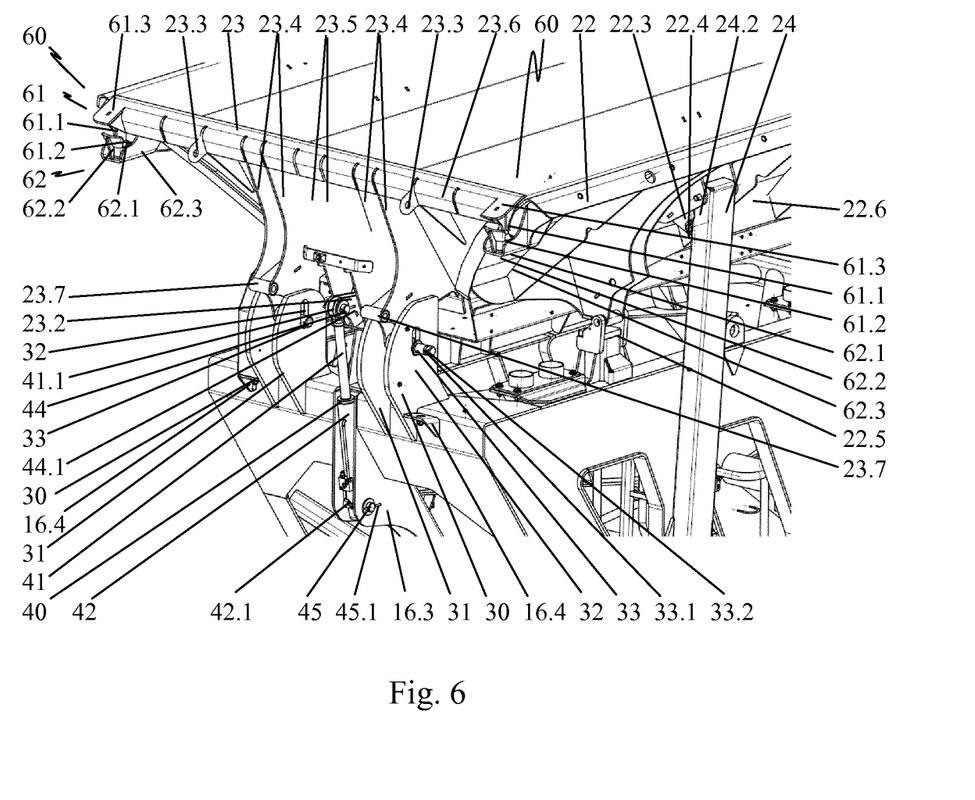

FIG. 6 shows the detail of the charging hopper 20 shown in FIG. 5, with the lowered rear wall 23. The charging hopper 20 is now located in its final working position. The closure inserts 61 of the closures 60 are inserted into the closure receivers 62 and secured there. As a result, a load-bearing connection between the side walls 21, 22 and the rear wall 23 is produced. The closure inserts 61 are retained in the closure receivers 62 by the weight force acting on the rear wall 23. For additional securing, tension springs which tension the closure inserts 61 may also be used. These tension springs may, in particular, be formed by the above-described spring(s) which is(are) tensioned between the bolts 33 and the bearing 16.4. Moreover, the actuator 40, 50 also retains the rear/side wall 21, 2 20, 23 in position. The side walls 21, 22 are supported by the supporting struts 24 relative to the chassis 16. The side walls 21, 22 and the rear wall 23 are thus securely retained in their working positions without supporting action being required by the actuators 40, 50. Material to be processed may thus be supplied to the vibrating charging channel 11.1 via the working hopper 20. The inlet plates 21.1, 22.1 of the side walls 21, 22, shown in FIGS. 2, 3 and 4, encompass the side rails 11.2 of the vibrating charging channel 11.1. The terminal portion 23.1 arranged on the rear wall 23 terminates the vibrating charging channel 11.1 opposite the prescreening unit 12. The angled portions 21.2, 22.2 of the side walls 21, 22 facing the rear wall 23 in each case cover the gap between the rear wall 23 and the side walls 21, 22. The material supplied to the charging hopper 20 is thus almost entirely supplied to the vibrating charging channel 11.1 and thus to the further treatment process.

In order to reach the working position, shown in FIG. 6, from the lifted position of the rear wall 23, shown in FIG. 5, the first actuator 40 is correspondingly retracted. The tension springs, not shown, acting on the guide bolts 33, transmit a force acting in the direction of the longitudinal extent of the linear guide 32 to the guide bolts 33 and thus to the rear wall 23. This results in a torque relative to the rotational axis formed by the first mounting eye 41.1 and the first bolt 44. The torque acts in the closing direction of the rear wall 23. This torque thus counteracts the torque produced by gravity on the rear wall 23. When the actuator 40 is retracted from the lifted position of the rear wall 23, therefore, this rear wall is displaced in a linear manner in the linear guide 32. The transverse movement is carried out until the closure inserts 61 are secured in the closure receivers 62. When lowered, the closure inserts 61 are guided by the obliquely arranged guide elements 62.2 in the direction of the side walls 21, 22. The side walls 21, 22 and the rear wall 23 are thus securely pulled together by the closures 60. The guide elements 62.2, when lowering the rear wall 23, also compensate for tolerances during the positioning of the closure inserts 61 relative to the closure receivers 62. The closures 60 are designed to be self-centering by means of the guide elements 62.2, the shaping of the closure inserts 61 and the closure receivers 62 corresponding thereto. In the present case, the self-centering is implemented by the balls 61.2 which, when lowering the rear wall 23, are automatically guided to the lowest point of the receiver sockets 62.1. As an alternative to the balls 61.2 and the receiver sockets 62.1, other geometric shapes may also be provided. Thus obtuse-angled or acute-angled cones or bodies with other rounded, for example parabolic, outer contours may be provided as a closure insert 61 with corresponding closure receivers 62.

For folding in the hopper walls from the working position into the transport position, initially the rear wall 23 is lifted by the rear first actuator 40. By means of the lifted rear wall 23, the closures 60 are released between the rear wall 23 and the side walls 21, 22. In the next step, therefore, the side walls 21, 22 may be folded by means of the second actuators 50 into their transport position shown in FIG. 2. Previously, the supporting struts 24 have been released from the lower supporting receivers 16.1 on the chassis 16. Subsequently, the rear wall 23 is lowered in a linear manner until the guide bolts 33 abut the lower end of the linear guides 32 of the deflection member. The first actuator 40 which is further compressed, from then on produces a torque which is oriented about the rotational axis formed by the guide bolts 33. The rear wall 23 pivots thereby into its transport position.

The exemplary embodiment shown shows an arrangement in which the rear wall 23 is movably mounted in the deflection member in a translational and rotational manner. Alternatively, it may also be provided that the side walls 21, 22 are correspondingly mounted in deflection members and thus may perform both the rotational and the translational movement. The rear wall 23 is then preferably mounted such that it is only able to perform a pivoting movement. The opening and closing procedure of the closures then takes place in a similar manner to the described sequences, wherein the movement sequences of the side walls 21, 22 and the rear wall 23 and the arrangement of the closure inserts 61 and the closure receivers 62 are switched. In general the rear wall 23 and the at least one side wall 21, 22 can be referred to as first and second walls, the first wall being one of the rear wall 23 and the at least one side wall 21, 22, and the second wall being the other of the rear wall 23 and the at least one side wall 21,22. In the exemplary embodiment shown in the drawings the first wall is the rear wall 23 and the second wall is the at least one side wall 21, 22. In the alternative embodiment the first wall is the at least one side wall 21, 22 and the second wall is the rear wall 23.

The invention claimed is:

1. A material processing apparatus, comprising:
a chassis; and
a charging hopper, including;
   first and second walls pivotably mounted relative to the chassis, the first wall being one of a rear wall and at least one side wall, and the second wall being the other of the rear wall and the at least one side wall;
   a first actuator connected between the chassis and the first wall and configured to adjust the first wall between a folded-down transport position and a folded-out working position;
   a second actuator connected between the chassis and the second wall and configured to adjust the second wall between a folded-down transport position and a folded-out working position;
   at least one deflection member configured to convert a movement of the first actuator during a portion of the movement of the first actuator into a rotational movement of the first wall, and during a further portion of the movement of the first actuator into a translational movement of the first wall; and
   at least one releasable closure configured such that in the transport positions of the first and second walls, the first wall is releasably connected to the second wall, and such that the releasable closure is lockable and unlockable by movement of the first wall.

2. The material processing apparatus of claim 1, wherein: the first wall is the rear wall and the second wall is the at least one side wall.

3. The material processing apparatus of claim 1, wherein: the first wall is the at least one side wall and the second wall is the rear wall.

4. The material processing apparatus of claim 1, wherein: the deflection member includes a linear guide defining a guide direction; and
the first wall is mounted in the linear guide in a linearly movable and a rotatable manner.

5. The material processing apparatus of claim 4, wherein: the first actuator is rotatably connected to the first wall such that a linear adjusting direction of the first actuator is oriented laterally spaced from a rotational axis of the first wall, and such that a force component of a force transmitted by the first actuator to the first wall is oriented in the guide direction of the linear guide.

6. The material processing apparatus of claim 4, wherein: the linear guide is oriented such that at least a component of an acting force of gravity is aligned with the guide direction.

7. The material processing apparatus of claim 1, wherein: the at least one releasable closure includes a closure insert attached to one of the first and second walls and a closure receiver attached to the other of the first and second walls; and the at least one releasable closure is configured such that by a translational movement of the first wall in a direction of a component of gravity the closure insert is able to be introduced into the closure receiver to lock the first wall to the second wall, and such that by a lifting translational movement of the first wall counter to the component of gravity the closure insert is able to be withdrawn from the closure receiver to unlock the first wall from the second wall.

8. The material processing apparatus of claim 7, wherein: the closure receiver and the closure insert are configured to be self-centering relative to one another.

9. The material processing apparatus of claim 8, wherein: the closure receiver is configured as a partial socket; and the closure insert is configured as a ball or spherical portion.

10. The material processing apparatus of claim 8, wherein: the closure insert is configured as a cone; and the closure receiver is configured as a conical receiver.

11. The material processing apparatus of claim 7, wherein: the closure receiver includes a guide element having an inclined guide surface configured to guide linear movement of the closure insert toward the closure receiver.

12. The material processing apparatus of claim 1, further comprising:

a spring element connected to the first wall and configured such that the spring element transmits a torque to the first wall, the torque acting toward the working position of the first wall.

13. The material processing apparatus of claim 12, further comprising:

the deflection member including a linear guide defining a guide direction;

the first actuator being pivotably connected to the first wall about a mounting point of the first actuator;

a guide bolt attached to the first wall, the guide bolt being received in the linear guide; and wherein the spring element is coupled to the guide bolt such that the spring element transmits a force oriented in the guide direction of the linear guide to the guide bolt, the force producing the torque acting on the first wall, the torque acting about the mounting point of the first actuator.

14. The material processing apparatus of claim 1, further comprising:

at least one supporting strut configured to support the second wall in its folded-out working position with the first wall locked by the releasable closure to the second wall.

15. The material processing apparatus of claim 14, wherein:

the at least one supporting strut has a U-shaped profile; and the second actuator is at least partially enclosed by the at least one supporting strut in the working position of the second wall.

16. The material processing apparatus of claim 1, wherein:

the at least one releasable closure is arranged between an upper end of the first wall and an upper end of the second wall, the upper end of the first wall facing the upper end of the second wall in the working positions of the first and second walls.

* * * * *